United States Patent [19]

Go et al.

[11] Patent Number: 4,901,440
[45] Date of Patent: Feb. 20, 1990

[54] SCISSORS

[75] Inventors: Seitaro Go; Shoichiro Go, both of Fukui, Japan

[73] Assignee: Yugen Kaisha Go Chuzo Tekkosho, Tsuruga, Japan

[21] Appl. No.: 154,294

[22] Filed: Feb. 10, 1988

[51] Int. Cl.⁴ .............................................. B26B 13/00
[52] U.S. Cl. ....................................... 30/254; 30/233; 30/257
[58] Field of Search ................ 30/250, 254, 257, 267, 30/134, 234, 194, 233, 229, 230, 232, 235, 244, 248, 253, 255, 256, 259

[56]   References Cited
U.S. PATENT DOCUMENTS

| 37,689 | 2/1863 | Heinisch | 30/257 |
| 1,395,758 | 11/1921 | Maszczyk | 30/250 |
| 1,775,086 | 9/1930 | Bonehill | 30/134 |
| 3,453,731 | 7/1969 | Wertepny | 30/267 |
| 4,534,109 | 8/1985 | Bush et al. | 30/254 |

FOREIGN PATENT DOCUMENTS 179824  12/1935  Switzerland ........................ 30/254

Primary Examiner—Douglas D. Watts
Assistant Examiner—Y. C. Lin
Attorney, Agent, or Firm—Jones, Tullar & Cooper

[57]        ABSTRACT

An improved pair of scissors having two blades pivotally connected by a swivel pin, the blades having their respective cutting edges which engage with each other at a point immediately adjacent to the swivel point when the cutting edges are in the closed position. This construction eliminates the possibility of creating the so-called "dead space" thus enabling opening of the cutting edges wide and providing a constant cutting length as well as a distinct sharpness.

6 Claims, 6 Drawing Sheets

SCISSORS

BACKGROUND OF THE INVENTION

I. Field of the Invention

The present invention relates to an improved pair of scissors and more particularly to such scissors having a constant cutting length per stroke as well as a distinct sharpness.

II. Prior Art

Conventional scissors are of such construction that both blades 100 and 200 are pivotally connected by a swivel pin 300 so as to allow the cutting edges 101 and 201 to be freely closed and opened as shown in FIGS. 9 and 10.

However, such scissors generally have the following drawbacks:

The angle which the blades of the scissors make is determined based on how wide the thumb of one hand (for example, the right hand in the case of a right-handed person) operating the scissors opens relative to the other fingers. And, at the start of the normal cutting operation, the cutting edges 101 and 201 of the respective blades engage at a point away from the swivel pin 300 as shown in FIG. 10. Consequently, scissors of this type have a so-called "dead space", or unused edge portions, and this will make it very difficult to provide a constant cutting length per stroke.

Also, due to the "dead space", one cannot make effective use of those portions of the cutting edges 101 and 201 adjacent to the swivel pin 300 forming the fulcrum of the scissors. It should be understood that those unused cutting edges adjacent to the swivel pin should give the greatest cutting force if used effectively. Thus, the scissor of this type inherently is not capable of providing optimum cutting performance.

SUMMARY OF THE INVENTION

It is the primary object of the invention to provide an improved pair of scissors that are free of the above-stated problems and have a constant cutting length per stroke as well as a distinct sharpness.

The foregoing object is achieved by the scissors of the present invention comprising at least two elongated blades each having a cutting edge and a loop handle, and a swivel pin connecting the blades to provide for pivotal movement thereof with respect to each other, the cutting edges of the blade being formed in such a manner that when they are in the closed position the cutting edges engage with each other at a point immediately adjacent to the swivel pin.

The scissors of the invention can provide the following advantages resulting from their specific construction described above.

(1) The scissors are of such construction that their cutting edges engage each other at a point immediately adjacent ot he swivel pin when the blades are in the closed position. This will permit an effective use of the entire cutting edges without producing the "dead space" in the portions thereof adjacent to the swivel pin. Also, the cutting length per stroke will be maximized to a constant value. Accordingly, when a long material is cut, the required number of cutting strokes will be minimized, which facilitates the cutting operation.

(2) It is possible to utilize those portions of the cutting edges close to the fulcrum or swivel pin of the scissors where the maximum cutting force is obtained, thus providing a distinct sharpness. Hence, the scissors are suitable for use in cutting not only paper and cloth but also harder materials, thus finding utility as garden shears, snips or the like.

BRIEF DESCRIPTION OF THE DRAWINGS

The foregoing objects and advantages of the invention will be apparent from the following description, the appending claims and the accompanying drawings wherein:

DETAILED DESCRIPTION OF THE INVENTION

A description will now be given of preferred embodiments of the invention with reference to the accompanying drawings.

Figure 1:
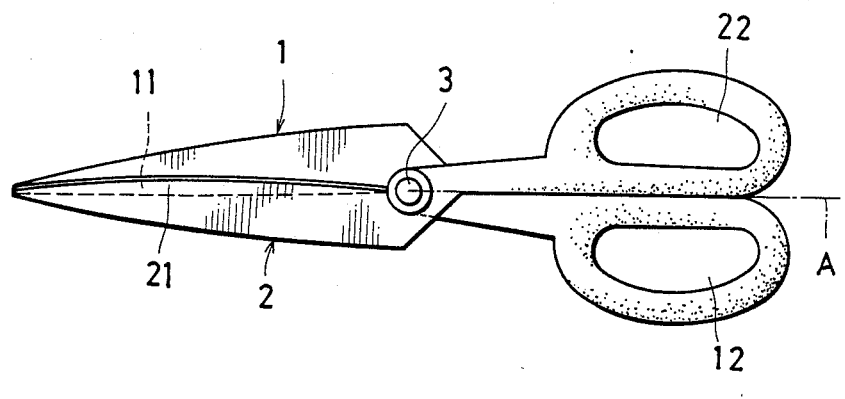
FIG. 1 is a front view illustrating a first embodiment of the invention.
Figure 2:
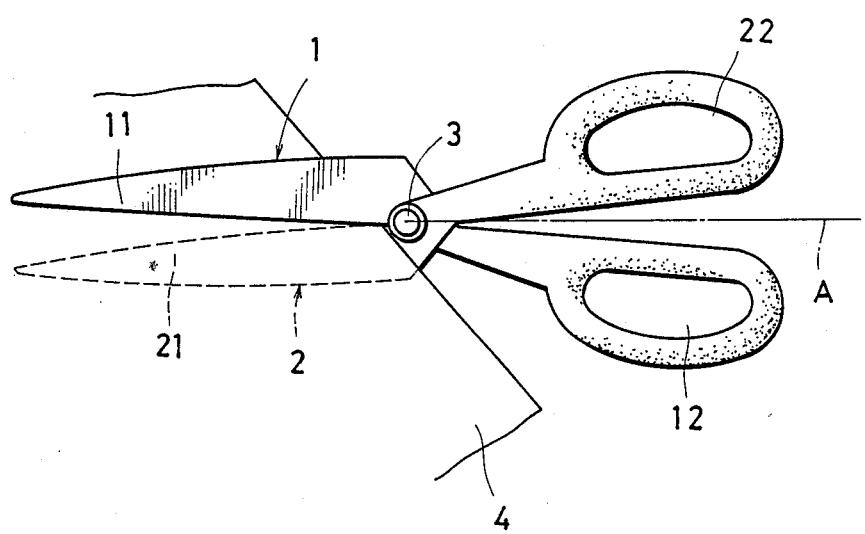
FIG. 2 is a view for use in explaining how to use the embodiment of the invention shown in FIG. 1.

FIGS. 1 and 2 show a first embodiment of the invention.

In the first embodiment, both blades 1 and 2 are shown in their closed position wherein they lie approximately on an imaginary line A which passes through the swivel pin and along which the loop handles of the scissors engage with each other.

One blade 1 has a pointed forward end and a cutting edge 11 which is formed on one side of the blade. The blade 1 has a loop handle 12 in the end opposite to the pointed end thereof. The other blade 2 is likewise formed with a cutting edge 21 which is equal in length to the cutting edge 11 of the blade 1. The blade 2 also has a loop handle 22 for inserting therethrough fingers including the index finger, but not the thumb.

Both blades 1 and 2 are pivotally connected to each other by a swivel pin 3 at the point generally corresponding to the terminal end of their respective cutting edges 11 and 21 and also very close to the point where the terminal ends of the cutting edges engage with each other, so as to allow the cutting edges to be opened and closed. The terminal ends of the cutting edges 11 and 21 overlap each other in the vicinity of the swivel pin 3.

Figure 8:
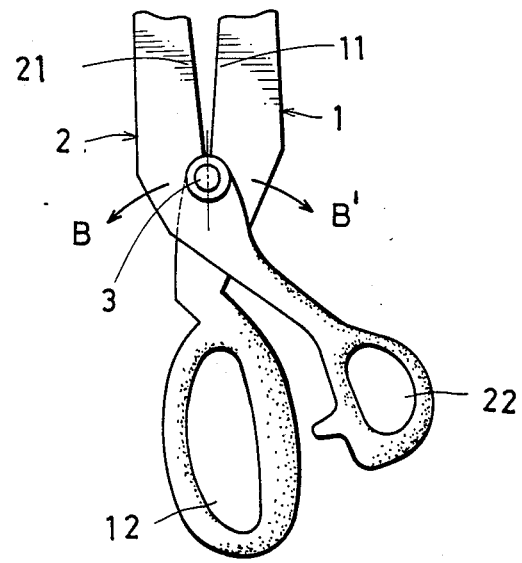
FIG. 8 is a view illustrating the essential portions of a further embodiment of the invention.

With this construction, the terminal ends of the cutting edges 11 and 21 of the blades 1 and 2, as shown in FIG. 8, may be arranged to move outward (in the directions of B and B') to provide a small gap in the vicinity of the swivel pin 3. However, when the cutting edges are closed, the terminal ends of the cutting edges 11 and 12 slightly overlap each other as described above.

In use, appropriate fingers are inserted into the loop handles 12 and 22 to operate the blades 1 and 2 so as to open the cutting edges 11 and 21 wide, as shown in FIG. 2. Thus, no dead space is formed in the terminal ends of the cutting edges that will otherwise prevent an effective and efficient cutting operation. Accordingly, when it is desired to cut a continuous length of paper, cloth or the like, a cutting length per stroke is equal to the entire length of each cutting edge 11 and 21, thus enabling the maximum use of the cutting length per stroke and also making the cutting length per stroke constant.

At the start of the cutting operation using this type of scissors, those terminal ends of the cutting edges 11 and 21 of the blades 1 and 2 that give the greatest cutting force will first engage and cut into the paper and cloth. This means a distinct sharpness of the scissors.

Figure 3:
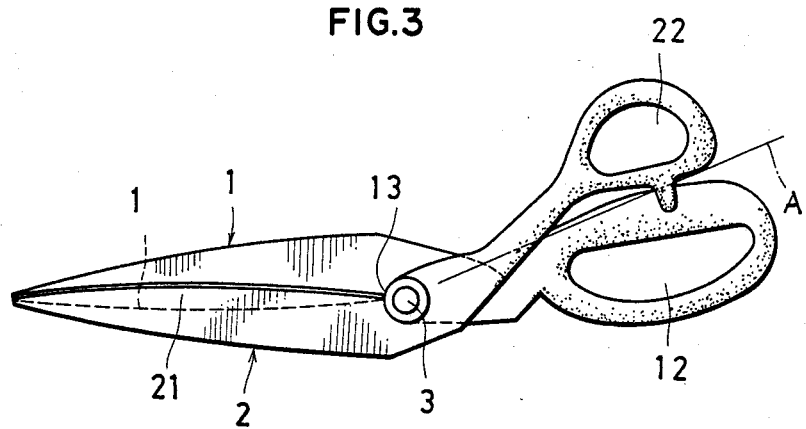
FIG. 3 is a view similar to FIG. 1 but showing a second embodiment of the invention with the scissors in the closed position.
Figure 4:
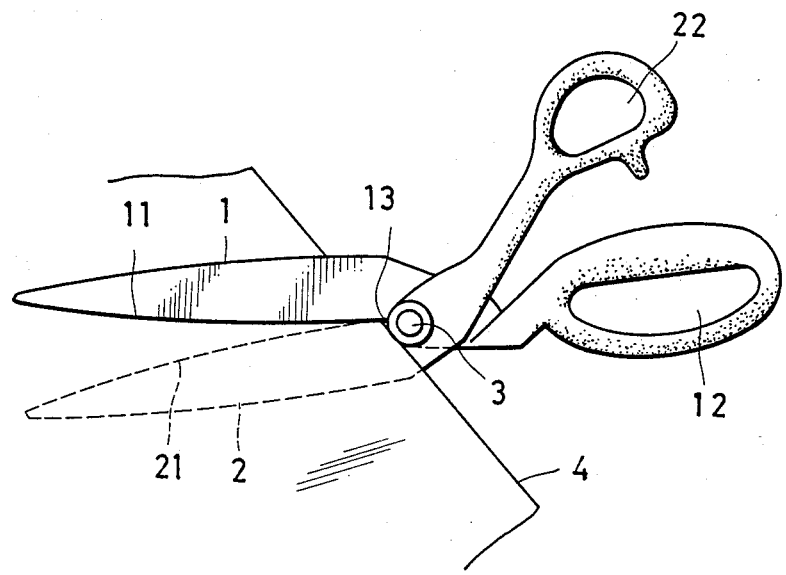
FIG. 4 is a view similar to FIG. 3 but showing the scissors in the open position.

FIGS. 3 and 4 show a second embodiment of the invention in which the blades 1 and 2 with the cutting edges 11 and 21 extend from the swivel pin 3 at a certain angle with respect to the imaginary line A of the scissors when the cutting edges 11 and 21 are in the closed position. In this embodiment also, the cutting edges 11 and 12 of the blades engage with each other at a point very close to the swivel pin 3.

This embodiment will greatly facilitate the cutting operation especially when a standing right-handed person uses this pair of scissors, since the cutting edges 11 and 21 of the blades 1 and 2 are generally disposed horizontally. This type of scissors can be modified for use by a left-handed person by having the blades extending on the opposite side of the axis A.

It is to be noted that the arcuate outer periphery 13 of the swivel pin 3 serves as a stopper against which the edge of a material to be cut is adapted to abut at the start of cutting operation. Because of the arcuate outer periphery 13 of the swivel pin 3, the stopper provides a reference point from which cutting strokes start, and this reference point does not move irrespective of the opening of the cutting edges 11 and 21.

Figure 5:
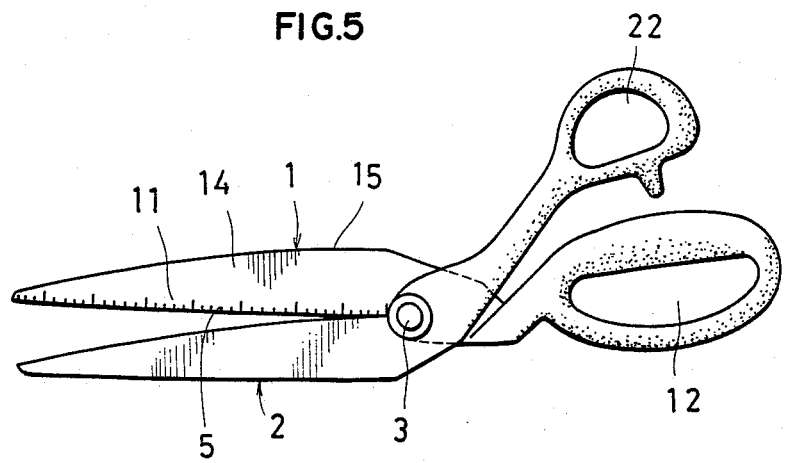
FIG. 5 is a view similar to FIG. 3 but showing a third embodiment of the invention.

FIG. 5 shows still another embodiment of the invention, in which the blade 1 has graduations 5 provided along the cutting edge 11 thereof so as to facilitate cutting to a desired length. When a material is desired to be cut to a desired length, the scissors of this embodiment will advantageously relieve the operator of the trouble of marking the material by means of a rule prior to the cutting operation. In this embodiment, the graduations 5 are provided near the cutting edge of the blade 1, but they may be provided so as to cover substantially the entire surface of the blade 1.

Figure 6:
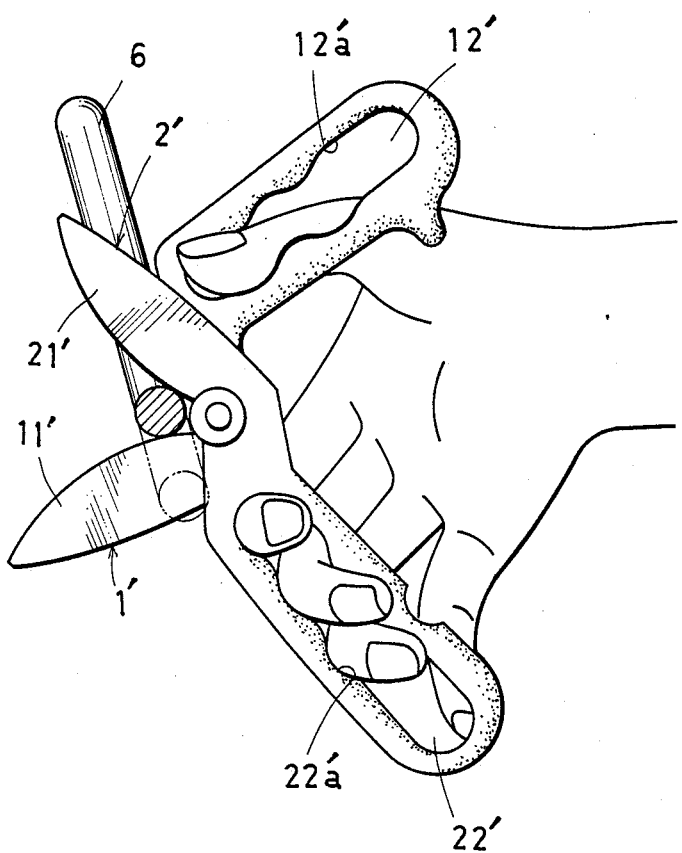
FIG. 6 and 7 show garden shears according to fourth and fifth embodiments of the invention, respectively.
Figure 7:
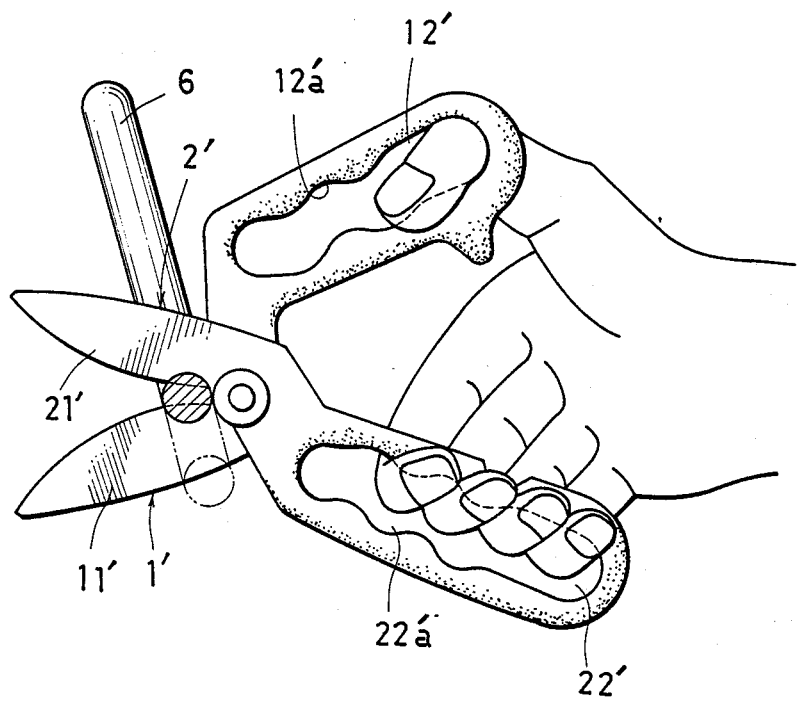
Figure 9:
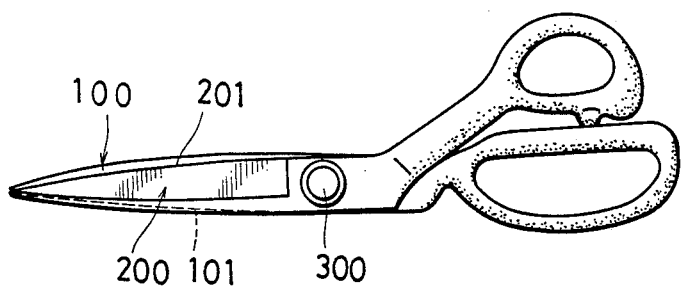
FIG. 9 is a view illustrating a conventional pair of scissors.
Figure 10:
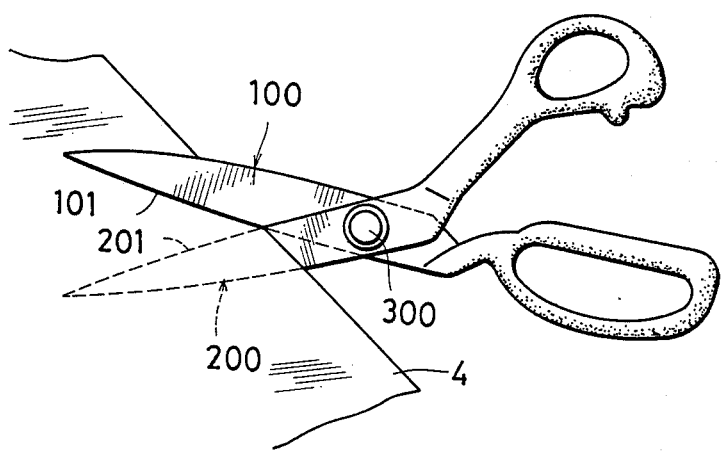
FIG. 10 is a view for use in explaining the use of the scissors shown in FIG. 9.

FIGS. 6 and 7 show an embodiment of the invention as applied to garden shears.

This embodiment is characterized in that the blades 1' and 2' are made shorter than the foregoing paper scissors. In addition, the loop handles 12' and 22' have a space sufficient to receive all the fingers therein, so that the thumb may be inserted into the opening of the loop handle 12' and the remaining four fingers into the opening of the loop handle 22'.

The loop handles 12' and 22' have openings which are defined in a wave-like manner to provide positive grip by the fingers. In use, the stem 6 or the like of a plant is clamped by holding the scissors with the fingers relatively adjacent the swivel pin so as to increase the opening of the blades 1' and 2', as shown in FIG. 6. After the stem 6 or the like has been clamped, the fingers in the opening of the loop handles 12' and 22' are shifted away from the swivel pin 3 for subsequent closing operation of the cutting edges to cut the stem 6.

In this embodiment, shifting of the fingers in the openings of the loop handles 12' and 22' toward the swivel pin 3 in an attempt to clamp the stem 6 will facilitate opening wide of the cutting edges of the blades 11' and 21'.

In addition, subsequent shifting of the finger's position away from the swivel pin will increase the cutting force thus facilitating the cutting operation greatly.

The present invention is not limited to the embodiments illustrated, but is subject to various modifications as desired such as for use by right-handed and left-handed persons. Also, the invention can find applications is garden shears, snips depending upon the kind of material to be cut.

What is claimed is:
1. A pair of scissors, comprising:
   at least two elongated blades each having a cutting edge and a loop handle; and
   a swivel pin connecting the blades to provide for pivotal movement thereof with respect to each other;
   the cutting edges of both blades falling substantially in line with said swivel pin and slightly crossing each other adjacent their terminal ends when said elongated blades are brought into a closed state, the outer peripheral portion of the swivel pin serving as a stopper when the blades are opened to a degree at which the normal cutting operation begins.
2. A pair of scissors as set forth in claim 1 wherein:
   the blades extend from the swivel pin at an angle with an axis along which the loop handles of the blades engage with each other when they are in the closed position.
3. A pair of scissors as set forth in claim 1 wherein:
   at least one of the blades has graduations formed along its cutting edge.
4. A pair of scissors as set forth in claim 1 wherein:
   the loop handles have elongated openings adapted for insertion of fingers, the fingers being first positioned within their associated openings at positions relatively close to the swivel pin at the start of the cutting operation and then moved away from the swivel pin to provide an increased cutting force.
5. A pair of scissors as set forth in claim 2 wherein:
   at least one of the blades has graduations formed along its cutting edge.
6. A pair of scissors as set forth in claim 2 wherein:
   the loop handles have elongated openings adapted for insertion of fingers, the fingers being first positioned within their associated openings at positions relatively close to the swivel pin at the start of the cutting operation and they moved away from the swivel pin to provide an increased cutting force.

* * * * *